United States Patent [19]

Moorer

[11] 3,992,023

[45] Nov. 16, 1976

[54] BABY CRAWLER

[76] Inventor: Donald K. Moorer, 3547 Jonathan Circle, Augusta, Ga. 30906

[22] Filed: Apr. 7, 1975

[21] Appl. No.: 565,822

[52] U.S. Cl. .......................... 280/87.02 R; 272/70.3

[51] Int. Cl.² .......................................... B62B 11/00

[58] Field of Search ............. 280/87.02 R, 87.02 W, 280/87.04 R, 87.04 A, 87.05, 47.13, 32.5, 32.6; 272/70, 70.3; 273/DIG. 8; 297/5; 5/128, 129; D12/130, 132, 31

[56] References Cited

UNITED STATES PATENTS

| | | | |
|---|---|---|---|
| 970,877 | 9/1910 | Bernstein | 296/20 |
| 1,369,216 | 2/1921 | Baynes | 280/32.5 X |
| 2,546,726 | 3/1951 | Creamer | 280/47.13 X |
| 2,571,037 | 10/1951 | Hoffman | 5/128 |
| 3,044,797 | 7/1962 | Borland | 280/32.6 X |
| 3,532,356 | 10/1970 | Lillibridge | 280/87.02 W |
| D213,370 | 2/1969 | Cherry | D12/128 X |

FOREIGN PATENTS OR APPLICATIONS

| | | | |
|---|---|---|---|
| 574,784 | 7/1933 | Germany | 280/32.6 |
| 374,849 | 3/1964 | Switzerland | 280/32.5 |

*Primary Examiner*—M. H. Wood, Jr.
*Assistant Examiner*—John A. Pekar

[57] ABSTRACT

A crawler type vehicle for aiding a baby trying to creep, the device consisting of a seating or cushion upon which the baby is placed resting upon his abdomen, the seating or cushion being supported upon rollable wheels so that when the child pushes against the floor with his hands and feet, the crawler device supports the weight of the baby so to make it easier for him to move or travel.

2 Claims, 8 Drawing Figures

Fig. 5
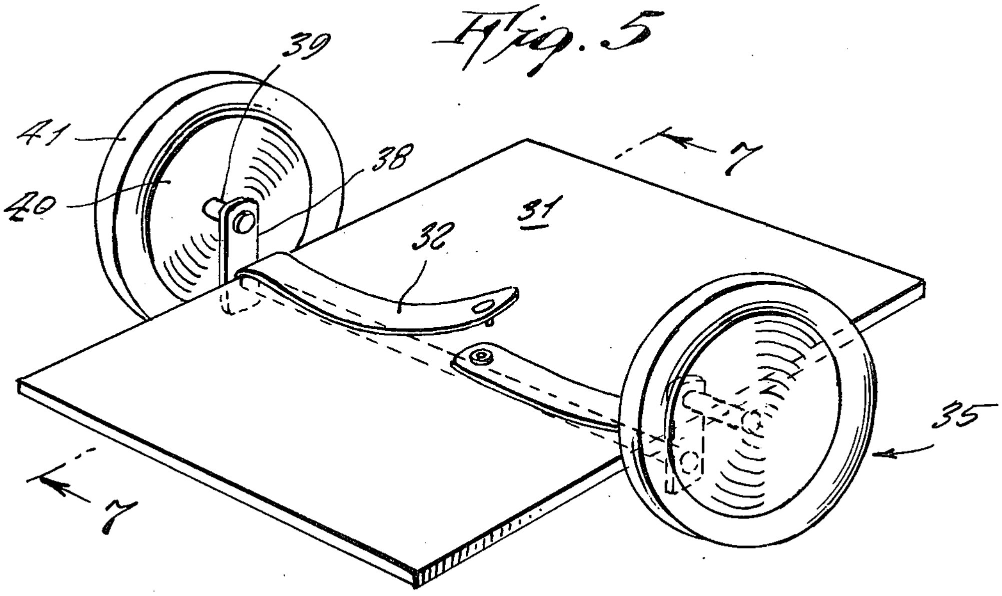
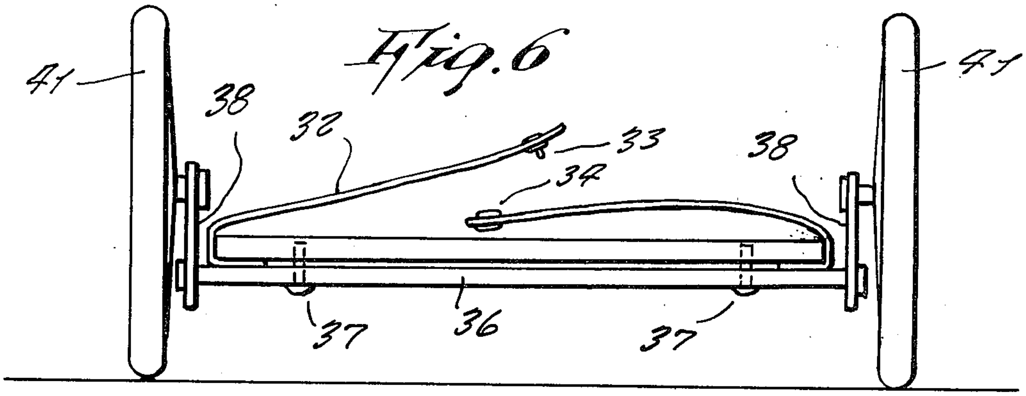
Fig. 6
Fig. 7
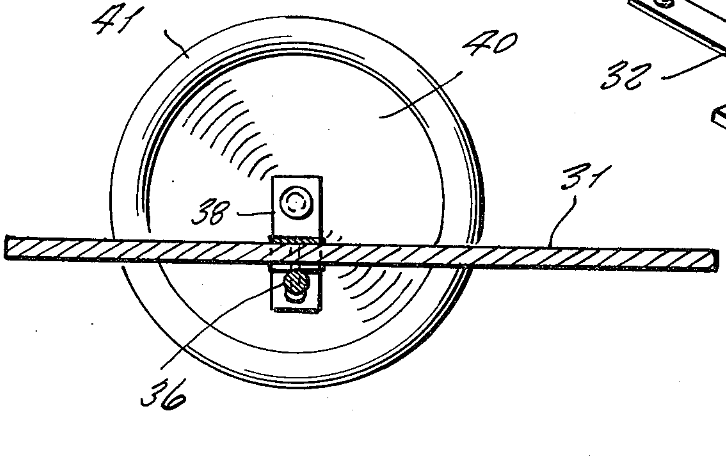
Fig. 8
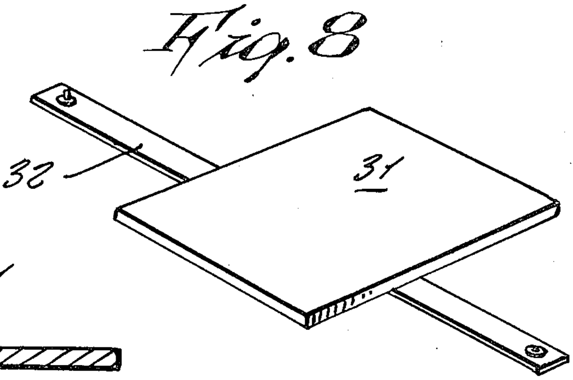

BABY CRAWLER

This invention relates generally to creeping devices. More specifically the present invention relates to creeper type vehicles designed particularly for babies.

A principal object of the present invention is to provide a baby crawler which includes rollable wheels so to assist the baby in moving about from place to place.

Another object of the present invention is to provide a baby crawler having the advantage of supporting the child's weight, thus making it easier for the infant to push himself about with less effort.

Still another object of the present invention is to provide a baby crawler which in one form of the invention is readily adjustable in length and elevation so to suit babies of varying size and age.

Still a further object of the present invention is to provide a baby crawler which aids in developing the muscles of the baby's arms and legs because the device permits these appendages to be used while the child is resting upon his stomach.

Other objects are to provide a baby crawler which is simple in design, inexpensive to manufacture, rugged in construction, easy to use and efficient an operation.

These and other objects will be readily evident upon a study of the following specification and the accompanying drawings, wherein:

FIG. 5 is a prespective view of a modified design of the invention.

FIG. 6 is an end view thereof.

FIG. 7 is an enlarged cross sectional view taken on line 7—7 of FIG. 5.

FIG. 8 is a perspective view of a cushion and strap that comprise components of the present invention.

Figure 1:
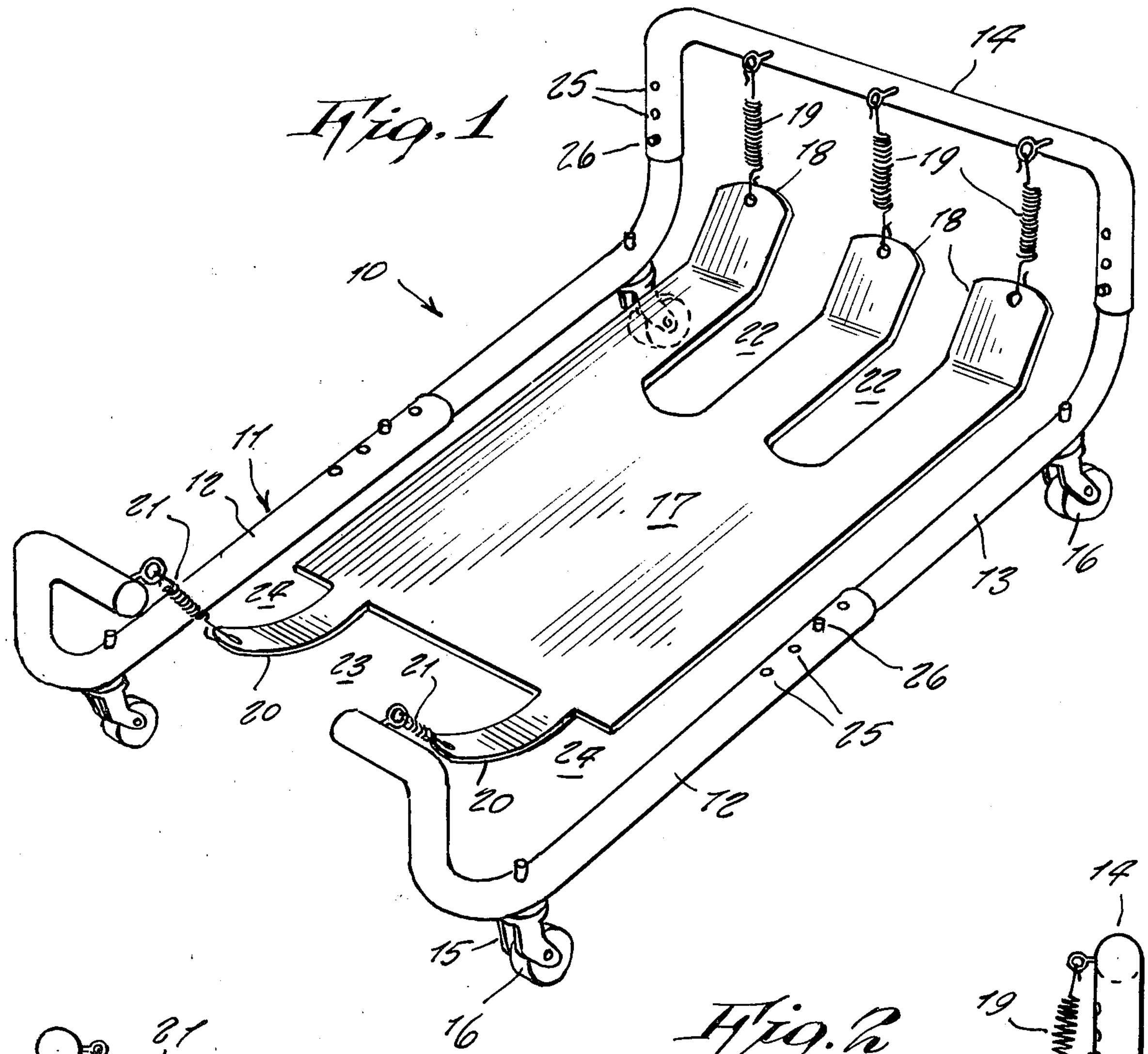
FIG. 1 is a perspective view showing one design of the present invention.
Figure 2:
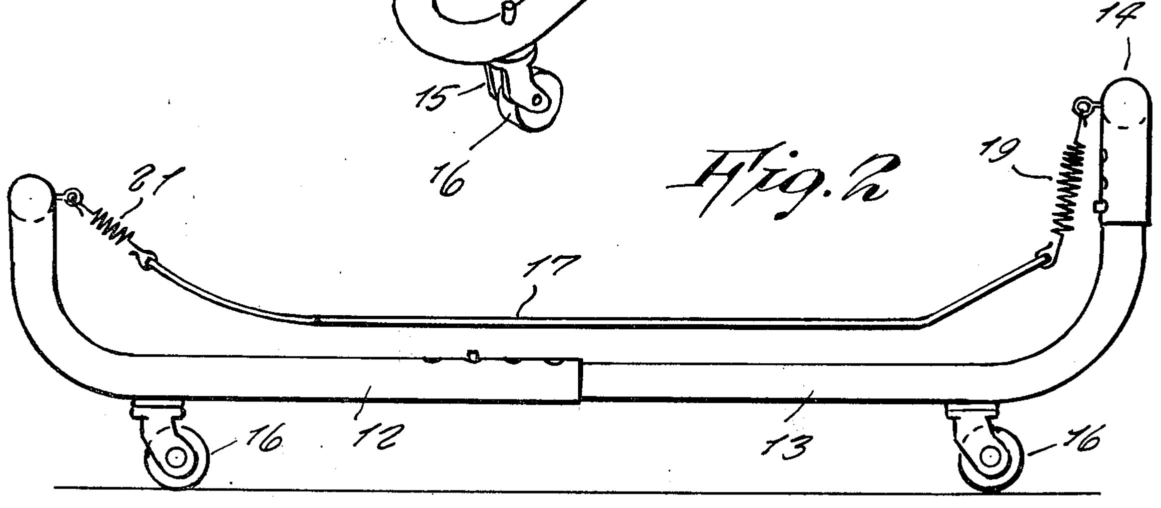
FIG. 2 is a side elevation view thereof.
Figure 3:
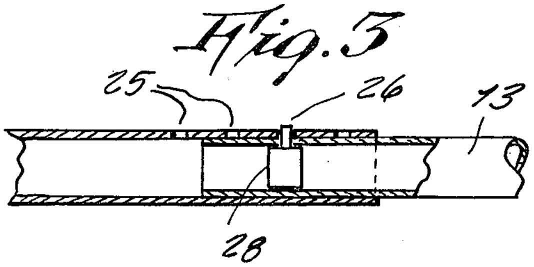
FIG. 3 is an enlarged detailed cross sectional view of one of the adjustable latching assemblies.
Figure 4:
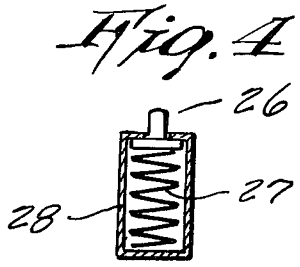
FIG. 4 is an enlarged cross sectional view through the adjustable latch.

Referring now to the drawings in detail, and more particularly to FIGS. 1 through 4 thereof at this time, the reference numeral 10 represents a baby crawler according to the present invention wherein there is a frame 11 comprised of aluminum tubing sections that are interfitted together as shown at 12, 13 and 14, the frame being supported upon a plurality of four casters 15 having caster wheels 16 adaptable to travel in any direction. The caster wheels are preferably made of a hard plastic material so to be able to travel across floors of a home without marring the same.

The frame 11 supports a seating 17 made of a polyurethane plastic material, the seating at one end being formed having three extending tabs 18 each of which are supported by means of compression coil springs 19 to the frame tubing section 14. The opposite end of the seating 17 is integral with a pair of extending tabs 20 each of which are connected to compression coil spring 21 supported upon upwardly turned ends of frame sections 12. It is to be noted accordingly that the tabs 18 thus formed create spaces 22 therebetween and within which the child's legs may be fitted when he is resting with his stomach upon the upper surface of the seating 17. Likewise at the opposite end a space 23 is formed between the tabs 20 and space 24 is formed adjacent the outer sides thereof all of which permits a child for his hands to reach a floor while propelling himself about.

As shown, the frame sections 12, 13 and 14 are adjustable so that the frame can be extended or contracted. This accomplished by means of a plurality of spaced apart openings 25 on certain of these members being selectively engagable with a button or pin 26 carried by an adjacent frame member. The button 26 is depressable downwardly against a compression coil spring 27 contained within a cylincal housing 28 and which is fitted within the interior of the aluminum tubing of section 13. It will be noted that such adjustment between frame sections 12 and 13 allow the frame to be longitudinally expanded whereas such adjustment between frame sections 13 and 14 allow vertical adjustment of the end of the frame.

Referring now to FIGS. 5 through 8, a modified design of a baby crawler 30 includes a polyurethane cushion 31 of approximately two inches thickness and which has a strap 32 secured transversy to the underside thereof, the strap ends being able to be swung up over the upper side of the cushion and secured together by means of snap fastener elements 33 and 34. Thus the strap serves to support a baby upon the cushion without falling off.

The polyurethane cushion 31 is supported upon a carriage frame 35 that consists of a transverse extending bar 36 passed under the cushion and secured thereto by means of bolts 37. The opposite ends of the bar 36 are secured to upwardly extending flat plates 38 each one of which at its upper end is pivotally supported upon a short shaft 39 secured to a wheel 40 fitted with a rubber tire 41. Alternately such rubber tire wheels may comprise a hard plastic wheel. The axles, the plates 38 and bar 36 are preferably made of an aluminum material.

In operative use, it is apparent that the weight of the cushion together with any infant placed thereupon causes the plates 38 to depend downwardly as shown in FIGS. 5 through 7 so that all times the center of gravity is below the axis of the axle 39. In use, the child simply rests upon the cushion and moves himself about as above described.

While various changes may be made in the detail construction, it is understood that such changes will be within the spirit and scope of the present invention as is defined by the appended claims.

What I claim is:

1. In a baby crawler, the combination of a creeper vehicle of a size intended for carrying a baby, said vehicle including a platform upon which said baby is placed, and wheel means for support thereof in order to move about, said platform comprising a raised seating supported by said frame, said frame being comprised of a plurality of tubular aluminum sections that are telescopically adjustable, said wheel means comprising casters and caster wheels, said seating having extending tabs formed at each opposite ends thereof, with spaces between said extending tabs, terminal ends of said tabs being suspended by tension coil springs from said frame, said spaces each being sufficiently wide for receiving therethrough the legs and hands of a child upon said platform for contacting a ground and thus propelling said creeper vehicle.

2. In a baby crawler, the combination of a creeper vehicle of a size intended for carrying a baby, said vehicle including a platform upon which said baby is placed, and wheel means for support thereof in order to move about, said platform comprising a polyurethane cushion with a transverse strap extending therearound for securing a baby thereupon, opposite ends of said strap having interconnecting snap fastener elements, said cushion being supported upon a transverse bar, opposite ends of which are connected to vertically extending straps pivotally attached to axles of wheels.

* * * * *